US010302445B2

(12) United States Patent
Lei et al.

(10) Patent No.: US 10,302,445 B2
(45) Date of Patent: May 28, 2019

(54) SYSTEM AND METHOD FOR NAVIGATION GUIDANCE USING A WIRELESS NETWORK

(71) Applicant: Ford Global Technologies, LLC, Dearborn, MI (US)

(72) Inventors: Oliver Lei, Windsor (CA); Allen R. Murray, Lake Orion, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 196 days.

(21) Appl. No.: 15/012,568

(22) Filed: Feb. 1, 2016

(65) Prior Publication Data

US 2017/0219369 A1 Aug. 3, 2017

(51) Int. Cl.
*G01C 21/36* (2006.01)
*G01C 21/34* (2006.01)
(Continued)

(52) U.S. Cl.
CPC ......... *G01C 21/3626* (2013.01); *G01C 21/34* (2013.01); *G01C 21/3492* (2013.01);
(Continued)

(58) Field of Classification Search
CPC .............. G01C 21/3626; G01C 21/34; G01C 21/3492; G08G 1/096822; G08G 1/0968;
(Continued)

(56) References Cited

U.S. PATENT DOCUMENTS 4,311,876 A    1/1982 Endo et al.
4,350,970 A *  9/1982 von Tomkewitsch ......................
                                              G08G 1/096811
                                                        340/905

(Continued)

FOREIGN PATENT DOCUMENTS

CN      101619980 A    1/2010
KR   1020030034915 A    5/2003
(Continued)

OTHER PUBLICATIONS

Search Report dated Jul. 6, 2017 for GB Patent Application No. GB 1701476.2 (4 pages).

*Primary Examiner* — Isaac G Smith
(74) *Attorney, Agent, or Firm* — Frank Lollo; James P. Muraff; Neal, Gerber & Eisenberg LLP

(57) ABSTRACT

Embodiments include a method for providing navigation guidance to a vehicle using roadside infrastructure communicatively coupled to a wireless network, the method comprising receiving, from a first vehicle, a request for navigation guidance to a destination; determining a first maneuver for navigating towards the destination from an initial location; and transmitting the first maneuver to the first vehicle. Embodiments also include a vehicle comprising a wireless transceiver for communicating with roadside infrastructure forming a wireless network, and a processor configured to: select a first unit included in the roadside infrastructure based on proximity to an initial location of the vehicle; send, to the first unit, a user-entered request for navigation guidance to a destination; and receive, from the first unit, a first maneuver for navigating towards the destination from the initial location.

19 Claims, 4 Drawing Sheets

(51) Int. Cl.
*G08G 1/0967* (2006.01)
*G08G 1/0968* (2006.01)

(52) U.S. Cl.
CPC . *G08G 1/096716* (2013.01); *G08G 1/096758* (2013.01); *G08G 1/096783* (2013.01); *G08G 1/096816* (2013.01); *G08G 1/096822* (2013.01); *G08G 1/096844* (2013.01)

(58) Field of Classification Search
CPC ....... G08G 1/096716; G08G 1/096758; G08G 1/096783; G08G 1/096944
USPC ......................................................... 701/421
See application file for complete search history.

(56) References Cited

U.S. PATENT DOCUMENTS

| | | | | |
|---|---|---|---|---|
| 4,357,593 A | * | 11/1982 | von Tomkewitsch | G08G 1/096716 340/988 |
| 5,187,810 A | | 2/1993 | Yoneyama et al. | |
| 5,508,917 A | * | 4/1996 | Siegle | G07B 15/063 701/1 |
| 5,839,086 A | * | 11/1998 | Hirano | G01C 21/26 340/988 |
| 8,706,409 B2 | * | 4/2014 | Mason | G01C 21/3469 701/411 |
| 8,972,171 B1 | * | 3/2015 | Barth | G01C 21/3492 701/414 |
| 2002/0040270 A1 | | 4/2002 | Kwak et al. | |
| 2008/0027635 A1 | | 1/2008 | Tengler et al. | |
| 2010/0198455 A1 | * | 8/2010 | Hotta | G07C 5/008 701/31.4 |
| 2012/0016536 A1 | * | 1/2012 | Patel | G08G 1/20 701/2 |
| 2013/0013196 A1 | * | 1/2013 | Dow | G01C 21/3415 701/445 |
| 2014/0320316 A1 | * | 10/2014 | Peri | G08G 1/08 340/907 |

FOREIGN PATENT DOCUMENTS

| | | | | |
|---|---|---|---|---|
| KR | 1020040035039 A | 4/2004 | | |
| KR | 100842519 B1 | 7/2008 | | |
| WO | WO 9607110 A1 | 3/1996 | | |
| WO | WO 2012171870 A1 | * | 12/2012 | ............ H04W 36/08 |

* cited by examiner

SYSTEM AND METHOD FOR NAVIGATION GUIDANCE USING A WIRELESS NETWORK

TECHNICAL FIELD

This application generally relates to navigation guidance and more specifically, to providing navigation guidance to a vehicle using a wireless network.

BACKGROUND

Many vehicles include on-board navigation systems that are integrated into a computing system of the vehicle and communicatively coupled to a location-determining receiver (e.g., Global Positioning System (GPS) receiver) included in the vehicle. Such on-board navigation systems are designed to use GPS or other satellite data to determine a current vehicle location, generate route guidance information for a destination, and display the current location, route guidance information, and associated map data on a display screen of the vehicle.

For vehicles that do not include built-in or on-board navigation capability, navigation functions can still be obtained while operating the vehicle by using, for example, personal navigation devices (e.g., dedicated GPS devices manufactured by TomTom®, Garmin®, Magellan®, etc.) that can be added to the vehicle after-market, or personal mobile devices equipped with navigation capability (e.g., a GPS-enabled smartphone with a mapping application). Typically, these personal devices include a location-determining receiver for obtaining GPS data and a display screen for displaying route guidance information and map data.

However, in some environments, such as, for example, an urban canyon or other setting in which tall structures flank both sides of a street, traditional GPS-guided navigation may not be reliable due to multipath interference, poor communication performance, and other satellite connectivity issues. In such cases, a GPS system may not be able to accurately detect a vehicle's location or the distance to an intersection.

Also, despite the above options, some vehicles have no navigation capability, on-board, built-in, add-on, handheld, or otherwise. In such cases, the vehicle operator cannot obtain navigation help while traveling on the road, for example, once plans change mid-route, the driver has lost his/her way, or road closures force the vehicle into an alternate route.

Accordingly, there is still a need in the art for a vehicle navigation system that can reliably provide accurate navigation guidance without relying on conventional navigation systems.

SUMMARY

The invention is intended to solve the above-noted and other problems by providing systems and methods designed to provide navigation guidance to vehicles using wireless communication between the vehicle and roadside infrastructure communicatively coupled to, and forming, a wireless network, such as, for example, a Dedicated Short Range Communications (DSRC) network.

For example, one embodiment provides a method for providing navigation guidance to a vehicle using roadside infrastructure communicatively coupled to a wireless network, the method comprising: receiving, from a first vehicle, a request for navigation guidance to a destination; determining a first maneuver for navigating towards the destination from an initial location; and transmitting the first maneuver to the first vehicle.

Another example embodiment includes a vehicle comprising a wireless transceiver for communicating with roadside infrastructure forming a wireless network, and a processor configured to: select a first unit included in the roadside infrastructure based on proximity to an initial location of the vehicle; send, to the first unit, a user-entered request for navigation guidance to a destination; and receive, from the first unit, a first maneuver for navigating towards the destination from the initial location.

Another example embodiment includes a method for obtaining navigation guidance in a vehicle using a wireless network formed by a plurality of roadside units, the method comprising: receiving, via a user interface, a request for navigation guidance to a destination; transmitting the request to a first roadside unit positioned within a predetermined distance from an initial vehicle location; and receiving, from the first roadside unit, a first maneuver for navigating from the initial vehicle location to the destination.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
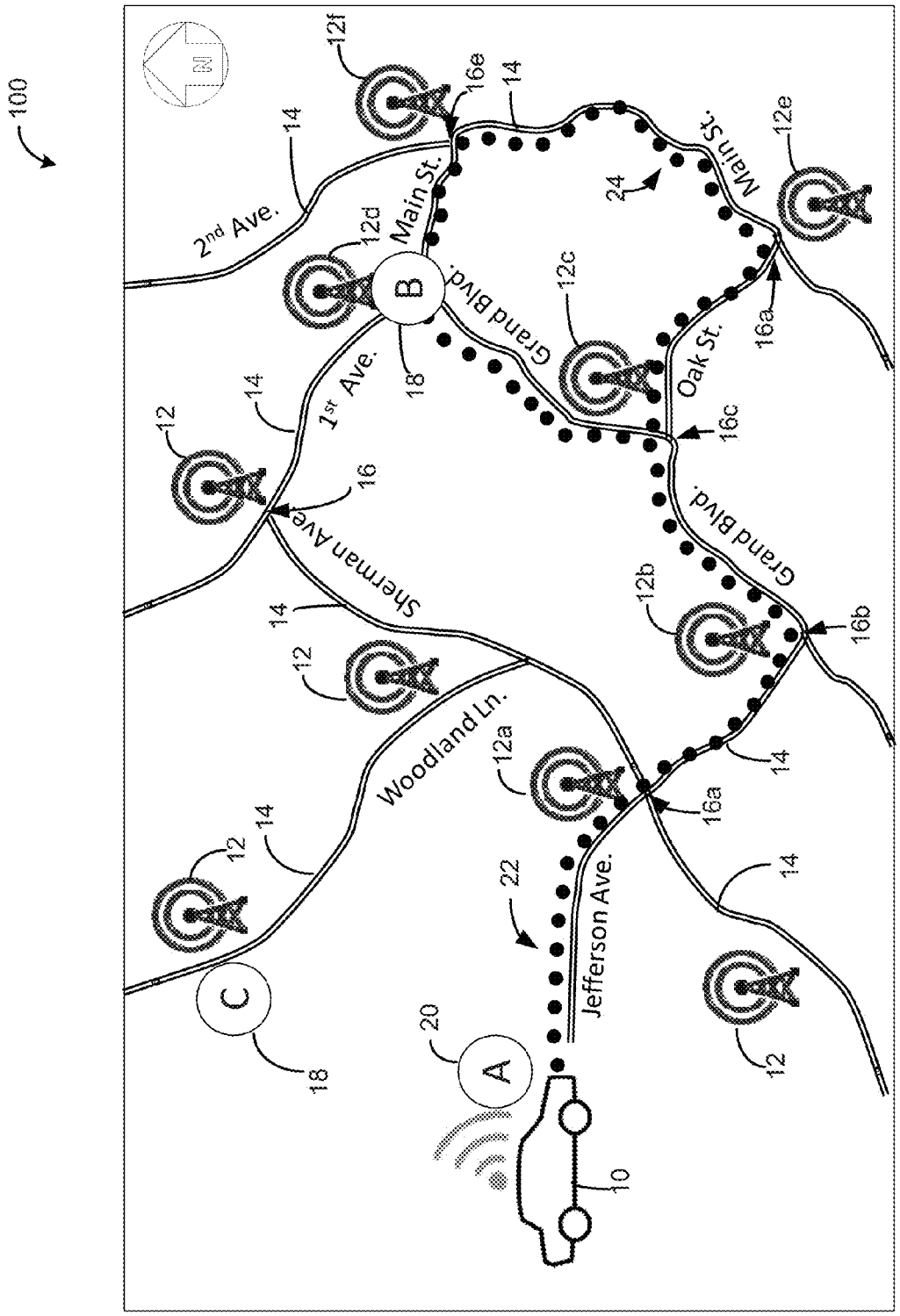
FIG. 1 is an illustration of an example environment for providing navigation guidance to a vehicle using a wireless communication network, in accordance with certain embodiments.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

As used herein, the term "navigation guidance" refers to static, or non-dynamic, navigation assistance that is obtained by a vehicle without employing an on-board navigation system or other in-vehicle navigational capability that relies on location data obtained from a location-determining satellite, such as, e.g., Global Positioning System (GPS) or the like. Instead, the navigation guidance comprises static maneuvers or directions obtained by the vehicle from existing roadside infrastructure using a local or short-range wireless communication network, such as, for example, a Dedicated Short Range Communications (DSRC) network. In accordance with embodiments, instead of map images, map data, or other dynamic route guidance that is typically provided by an on-board navigation system, the navigation guidance comprises step-by-step navigational directions, or static commands, for guiding a driver of a non-navigation-capable vehicle from a starting location to an intended destination. Based on the static directions, the driver can navigate towards the destination manually, for example, by watching for street names and other roadside indicators provided in the navigational directions, instead of watching the vehicle's progress on a map.

In embodiments, the navigation guidance includes directions to perform certain driving maneuvers, such as turn (e.g., turn left, turn right, take a U-turn, etc.), merge (e.g., merge left, merge right, etc.), veer (e.g., veer left, veer right, etc.), stay (e.g., stay in current lane), follow (e.g., follow signs to an upcoming highway), continue (e.g., continue straight, continue onto an upcoming road, etc.), head (e.g., head south, head north, etc.), use (e.g., use left lane, use any lane, etc.), take (e.g., take an upcoming exit, take a sharp right), etc.), stop or pull over, or other directional commands. The navigation guidance can also include street names, highway or route numbers, roadside descriptors (e.g., first cross street, third stop sign, etc.), house or building numbers, and other road-related information to indicate where or when to perform the maneuver (e.g., turn left at Oak Street, merge onto Canal Street, turn right at the first traffic light, etc.). In some cases, the navigation guidance can further include driving distances or times associated with performance of the maneuvers, or to indicate a distance or time until performance of the next maneuver or direction (e.g., continue on Canal Street for 2 miles, turn left in 300 feet, etc.). The navigation guidance may also include information about or describing the destination (e.g., the destination will be on the left, the destination will be 20 feet ahead of the stop sign, etc.) and/or the starting location (e.g., route guidance begins at the intersection of Devon Avenue and Golf Road, route guidance begins at 2438 Sixth Street, etc.).

Preferred embodiments of the systems and methods disclosed herein utilize dedicated short range communications (DSRC) to provide navigation guidance to a non-navigation capable vehicle. DSRC is a two-way, short-range or medium-range wireless communications technology that is designed for automotive use to exchange a wide range of information in both vehicle-to-vehicle (V2V) applications and vehicle-to-infrastructure (V2I) applications (e.g., government infrastructure). For example, DSRC technology has been proposed for use in a number of roadside applications, including improve traffic safety, provide accident reports, convey approaching emergency vehicle warnings and/or sudden braking ahead warnings, and accept electronic parking and toll payments. Because the DSRC range is relatively short (e.g., 100-1000 meters), DSRC infrastructure (or roadside units) will be widely and densely deployed at intersections and along roadways within a given metropolitan area in order to facilitate communication across the entire area and form a robust DSRC network. Compared to other wireless technologies (e.g., WiFi, satellite, Near Field Communication (NFC), Bluetooth, etc.), DSRC technology can permit secure, reliable communications directly between vehicles, or between vehicles and roadside units (e.g., over a dedicated communications channel), and can be used to conduct point-to-point wireless communications (e.g., wireless messages directed at a specific vehicle or roadside unit), as well as to broadcast wireless messages to all vehicles and roadside units within a limited broadcast area. In the United States, DSRC is allocated for high frequency radio transmission, for example, in a dedicated 75 MHz spectrum band around 5.9 GHz.

FIG. 1 illustrates an example environment 100 for providing navigation guidance to a non-navigation-capable vehicle 10 using wireless communications with existing roadside infrastructure 12, in accordance with embodiments. As shown, the infrastructure 12 is comprised of a plurality of communication towers or roadside units 12 positioned at various locations along roads 14 (e.g., streets, avenues, boulevards, highways, etc.), at intersections 16 of said roads 14, and/or at one or more destinations 18 (such as, e.g., houses, buildings, points of interest, etc.). Each roadside unit 12 can comprise a computing device (such as, e.g., computing device 200 shown in FIG. 2) configured to facilitate wireless communication between the units 12 and with the vehicle 10, as well as other nearby vehicles (not shown), and for communicatively connecting the unit 12 and/or the vehicle 10 to a remote server associated with the infrastructure 12.

In embodiments, each roadside unit 12 can be configured to know its own location, as well as the locations of roads, intersections, points of interest, and/or other roadside units 12 that are within a predetermined distance of the roadside unit 12. These known locations, as well as map data, may be stored in a memory of the computing device of the unit 12. The map data may be provided to each unit 12 by the remote server associated with the infrastructure 12, or may be locally saved at, or programmed into, each unit 12. In some cases, each unit 12 can be configured to broadcast the known locations to the vehicle 10 and other vehicles (not shown) within a wireless communication range of the unit 12.

The infrastructure 12 can be configured to detect or determine a current location of the vehicle 10, or any other vehicle, using one or more known techniques. For example, the infrastructure 12 may use trilateration or triangulation techniques to detect a vehicle location. Further, an antenna included in each roadside unit 12 can be beam-formed to an adjacent street to help detect a vehicle location. In some cases, the infrastructure 12 can be configured to detect or determine a distance to the vehicle 10, or any other vehicle, for example, by measuring a signal strength of a signal received from the vehicle, or other known techniques.

The environment 100 can utilize any type of wireless communication network or technology, including, for example, digital cellular networks, Bluetooth, wireless LAN, infrared networks, radio frequency identification (RFID), near field communication (NFC), etc. In a preferred embodiment, the roadside infrastructure 12 and the vehicle 10 are configured to wirelessly communicate with each other over a dedicated short range communication (DSRC) network, or using any other wireless technology that can provide very high data transmission, low latency, and reliable performance in high vehicle speeds and extreme weather conditions.

Figure 3:
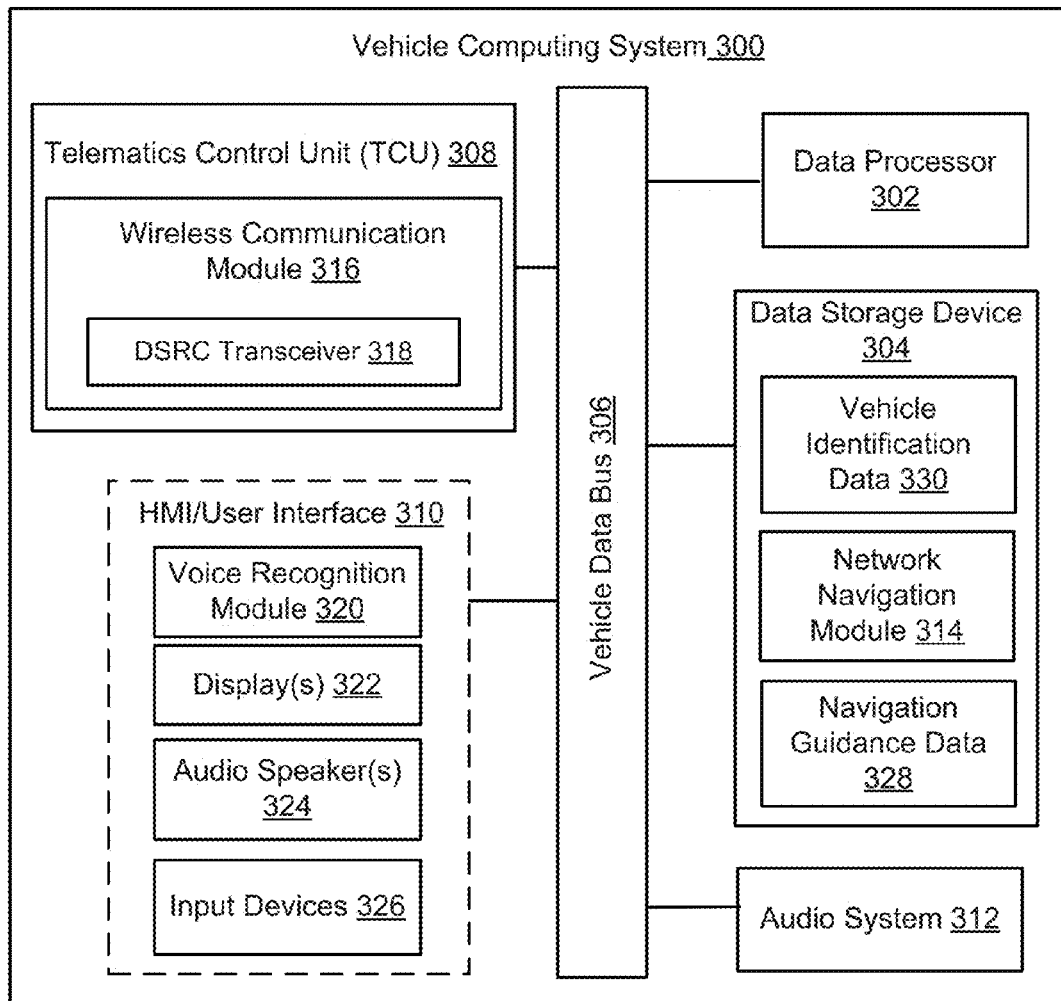
FIG. 3 is a block diagram of an example vehicle computing system included in a vehicle configured for obtaining navigation guidance using a wireless communication network, in accordance with certain embodiments.

The non-navigation-capable vehicle 10 can comprise a vehicle computing system (such as, e.g., vehicle computing system (VCS) 300 shown in FIG. 3) configured to wirelessly communicate with the roadside infrastructure 12 for requesting navigation guidance to a destination, for receiving corresponding navigation guidance from at least one of the roadside units 12, and for exchanging other information (such as, e.g., real-time accident reports and other traffic information, emergency vehicle warnings, etc.). The vehicle computing system can also be configured to enable a driver or vehicle operator to enter or input a request for navigation guidance using a user interface of the vehicle 10 (such as, e.g., user interface 310 shown in FIG. 3), and to present the navigation guidance received from the roadside unit 12 to the vehicle driver via the user interface.

The request for navigation guidance can include destination information, such as, for example, an address, a point of interest, an intersection, or other information for identifying an intended destination 18. The request can also include a unique identifier to identify the vehicle sending the request, such as, for example, a vehicle identification number (VIN), a device identifier (ID) associated with a DSRC transceiver included in the vehicle 10 (such as, e.g., DSRC transceiver 318 shown in FIG. 3), or a username selected by the driver of the vehicle 10. In some cases, the unique identifier is stored in a memory (such as, e.g., data storage device 304 shown in FIG. 3) of the vehicle computing system and can be automatically added to the request for navigation guidance by the vehicle computing system prior to sending the request for route guidance. In other cases, the unique identifier is entered by the vehicle driver, along with the destination information, as part of the process for creating the request for navigation guidance.

The vehicle 10 can send the request for navigation guidance to one or more roadside units 12. In some embodiments, the vehicle 10 generally broadcasts the request for navigation guidance, and the request can be received by any roadside unit 12 within a broadcast range (or predetermined proximity) of the vehicle 10 (e.g., 100 to 1000 meters). In some such cases, the infrastructure 12 can be configured such that only the roadside unit that is closest to a current location 20 of the vehicle 10, such as, for example, unit 12a in FIG. 1, responds to the vehicle's request. In other cases, the infrastructure 12 may apply one or more selection rules to determine which of the units 12 will respond to the request. In other embodiments, the vehicle 10 first pings all roadside units 12 that are within the broadcast range and waits for a response from the unit 12 that is closest to the current location 20 and/or is able and willing to provide navigational guidance to the vehicle 10. The vehicle 10 can then use point-to-point communication to transmit the request for navigation guidance to the responding unit 12. In some cases, after pinging all of the units 12, the vehicle 10 may rank the nearby roadside units 12 based on proximity thereto and send the request for navigation guidance to each unit 12 on the list, one by one, until a positive response (e.g., in the form of navigation guidance) is sent back to the vehicle 10. It will be appreciated that other techniques may be used to select one of the roadside units 12 for providing navigation guidance to the vehicle 10.

According to embodiments, upon receiving the request for navigation guidance, the responding roadside unit 12, such as, e.g., initial roadside unit 12a in FIG. 1, can be configured to determine the current location 20, or starting point A, of the requesting vehicle 10 and calculate or determine a route 22 to a requested destination 18, or ending point B. The calculated route 22 can include one or more static maneuvers, or navigational directions, for guiding the vehicle driver from the starting point A to the ending point B. If the calculated route 22 requires more than one maneuver, the maneuvers may be listed in series, or in order of performance from an initial maneuver to a final maneuver. The responding roadside unit 12 can send at least the initial maneuver to the vehicle 10 as navigation guidance for the destination B. In addition, the responding roadside unit 12 can be configured to send the calculated route 22, or the entire list of maneuvers, and the requesting vehicle's unique identifier, to one or more other roadside units 12 that are along, or adjacent to, the calculated route 22, such as, e.g., subsequent roadside units 12b, 12c, and 12d in FIG. 1.

Each of the roadside units 12 (e.g., the initial roadside unit 12a and the subsequent units 12b-d) can be configured to store the list of maneuvers for the calculated route 22 in a memory of its computing device, along with the unique identifier of the vehicle 10, to facilitate future retrieval of the route by the vehicle 10 and/or the unit 12 in accordance with techniques disclosed herein. Upon receiving the calculated route 22 and vehicle identifier, each of the subsequent roadside units 12 can be alerted that the identified vehicle 10 is in a navigation guidance mode and in response, can automatically monitor a progress of the vehicle 10 along the route 22. In addition, the units 12 can be configured to share or report the progress of the vehicle 10 with each other and/or the vehicle 10, for example, to inform the infrastructure 12 and/or the vehicle 10 if the vehicle 10 strays from the route 22. Also, the units 12 can be configured to report road or traffic conditions to each other and/or the vehicle 10 that may affect or alter the calculated route 22 to the destination B (e.g., due to road closures, traffic congestion, etc.).

In some embodiments, the infrastructure 12 can be configured to send the list of maneuvers for the route 22 in a piecemeal manner (such as, e.g., one or two maneuvers at a time), so that the vehicle 10 receives step-by-step navigation guidance from the roadside units 12 as the vehicle 10 travels along the route 22. In such embodiments, each of the roadside units 12 along the route 22 can be assigned to one or more maneuvers in the route 22 based on a proximity of the unit 12 to a location associated with the maneuver(s). In some cases, upon receiving the calculated route 22, the computing device included in each of the units 12 can be configured to determine which maneuver(s) are assigned to that unit 12 and can be prepared to provide the assigned maneuver(s) once the vehicle 10 approaches the unit 12. In other cases, a remote or central server associated with the infrastructure 12 can be configured to assign maneuver(s) to each of the units 12 along the calculated route 22. In either case, each time the vehicle 10 completes a maneuver, or approaches a location associated with a next maneuver in the list, the vehicle 10 receives the next maneuver from the roadside unit 12 that is next along the calculated route 22, is closest in proximity to the location of the next maneuver, or is otherwise assigned to the next maneuver on the list. This may continue until the vehicle 10 completes all of the maneuvers in the route 22 and reaches the intended destination B.

For example, in the illustrated embodiment, the initial roadside unit 12a may send only the first maneuver of the calculated route 22 (e.g., "continue for 2 miles on Jefferson Ave.") to the vehicle 10. Once the vehicle 10 completes the first maneuver, or otherwise approaches a location for performing a second maneuver (e.g., the intersection 16b) of the calculated route 22, the subsequent roadside unit 12b, or the unit 12 that is closest to the location for performing the second maneuver, may send the second maneuver (e.g., "turn left onto Grand Blvd.") to the vehicle 10. And as the vehicle 10 approaches a location for performing a third maneuver (e.g., the intersection 16c), the subsequent roadside unit 12c, or the unit 12 that is closest to the location, may send the third maneuver of the calculated route 22 (e.g., "continue on Grand Blvd. for 1 mile") to the vehicle 10. Finally, as the vehicle 10 approaches the destination B or once the third maneuver is complete, the subsequent roadside unit 12d, or the unit 12 that is closest to the destination B, may send a fourth maneuver indicating the end of the route 22 (e.g., "the destination is at the intersection of Grand Blvd., Main St., and $1^{st}$ Ave.").

In other embodiments, the infrastructure 12 can be configured to send the entire list of maneuvers all at once, so that the vehicle 10 receives a complete set of navigation guidance from the responding roadside unit 12. In such embodiments, as the vehicle 10 approaches each of the subsequent roadside units 12b, 12c, and 12d along the calculated route 22, the computing device of each of the units 12b, 12c, and 12d can be configured to monitor the progress of the vehicle 10, for example, by retrieving the stored route 22 and determining whether or not the vehicle 10 is still following the route 22, rather than sending maneuvers piece by piece. In some cases, the vehicle 10 can be configured to send an "on-route" status message to each roadside unit 12 that it passes in order to request confirmation that the vehicle 10 is still following the route 22, and each passing roadside unit 12 may examine the vehicle's status in response to this message from the vehicle 10. In some cases, if the infrastructure 12 verifies that the vehicle 10 is on track, the subsequent roadside units 12b, 12c, and 12d may resend a current maneuver and/or the next maneuver on the route 22 to remind the vehicle driver of the upcoming maneuver.

In embodiments, the infrastructure 12 can be configured to re-calculate a route to the requested destination B upon determining that a portion of the previously calculated route 22 is no longer a viable travel option, upon determining that the vehicle 10 is no longer on the calculated route 22, or upon receiving a request to re-route from the vehicle 10. For example, based on real-time traffic information available through the DSRC network, the infrastructure 12 may determine that one or more portions of the route 22 are excessively congested (e.g., due to rush hour times), closed (e.g., due to a traffic incident), or otherwise unavailable for travel. Further, the vehicle 10 may veer off of the calculated route 22, either by mistake (e.g., the vehicle driver missed a maneuver or misunderstood the navigation guidance) or by force (e.g., due to road closures or other traffic changes).

In some embodiments, the infrastructure 12 can be configured to automatically determine that the vehicle 10 is no longer following the calculated route 22, for example, upon determining that the vehicle 10 is moving away from the roadside unit 12 that is next on the route 22, or that the vehicle 10 missed a maneuver (e.g., turned left instead of right, etc.). In some embodiments, the vehicle 10 can be configured to send out a second request for navigation guidance, for example, once the driver of the vehicle 10 realizes that he missed a maneuver included in the navigation guidance received from the infrastructure 12 or upon encountering a road closure.

When calculating a new route 24 to the intended destination B, the infrastructure 12 can be configured to use a new current location of the vehicle 10 as the starting location for the new route 24 and send new navigation guidance to the vehicle 10 based thereon. The infrastructure 12 can also be configured to send a new list of maneuvers to any roadside units 12 along the new route 24 for storage therein and to instruct the units 12 to delete any previously stored maneuvers for the old route 22. The new route 24 may include one or more of the roadside units 12 from the previously calculated route 22 and/or completely new units 12, depending on, for example, how far away from the route 22 the vehicle 10 has strayed, or how much re-routing is required to avoid unavailable roads.

As an example, in the illustrated embodiment, the driver of the vehicle 10 may have missed the third maneuver to continue on Grand Blvd. and may be turned onto Oak St. instead. In response, the roadside unit 12c calculates a new route 24 comprising a new list of maneuvers for directing the driver to the destination B. The roadside unit 12c then sends a first maneuver of the new route 24 (e.g., "continue on Oak St. for a half mile") to the vehicle 10. In addition, the unit 12c sends the entire route 24 to any subsequent roadside units 12 that are along the new route 24, such as, for example, roadside units 12e and 12f. As the vehicle 10 approaches a location of a second maneuver of the new route 24 (e.g., the intersection 16d), the roadside unit 12e sends the second maneuver (e.g., "turn left onto Main St.") to the vehicle 10. And as the vehicle 10 approaches a location of a third maneuver of the new route 24 (e.g., intersection 16e), the roadside unit 12f sends the third maneuver (e.g., "veer left to stay on Main St.") to the vehicle 10. Finally, as the vehicle 10 approaches the destination B, the roadside unit 12d sends a fourth and final maneuver of the new route 24 (e.g., "the destination is at the intersection of Grand Blvd., Main St., and $1^{st}$ Ave.") to the vehicle 10.

In some embodiments, instead of sending only one request at the beginning of the route 22, the vehicle 10 can be configured to periodically request navigation guidance as the vehicle 10 travels along the route 22, thus enabling the vehicle 10 to receive up-to-date navigation guidance regardless of whether the vehicle 10 is on the originally-calculated route 22 or has veered off. For example, the vehicle 10 may broadcast an "on-route" status message to nearby roadside units 12 to request confirmation that the vehicle 10 is still on route. The on-route status message may include the intended destination B and unique identifier of the vehicle 10. As a result, any roadside unit 12 that receives the on-route status message is equipped with enough information to provide updated navigation guidance, if needed, or otherwise confirm that the vehicle 10 is on route, regardless of whether the unit 12 was included in the previously-calculated route 22. For example, in response to the on-route status message, the navigation guidance received by the vehicle 10 from a given unit 12 may include a next maneuver from the calculated route 22, a direction to continue with the current maneuver, or a new maneuver based on the updated route 24. In some embodiments, each roadside unit 12 may still send calculated route information "forward" to subsequent roadside units 12 along the route, along with the vehicle's unique identifier, to help speed up processing time, for example, if the vehicle 10 is still en-route to the destination B.

Figure 2:
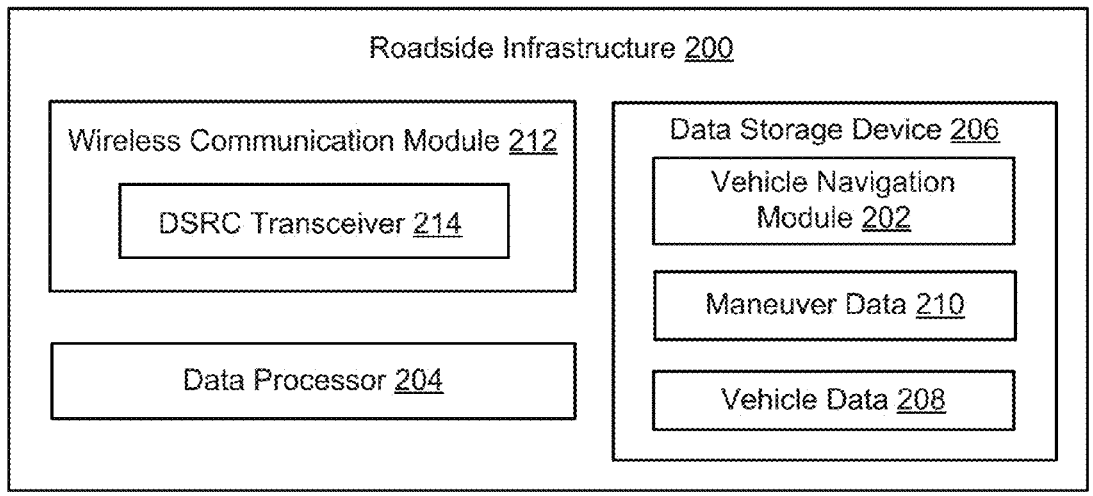
FIG. 2 is a block diagram of an example computing device included in a roadside infrastructure configured for providing navigational guidance using a wireless communication network, in accordance with certain embodiments.

Referring additionally to FIG. 2, shown is an example computing device 200 that can be included in one or more units of the roadside infrastructure 12 in the environment 100, in accordance with embodiments. As shown, the computing device 200 includes a vehicle navigation module 202, a data processor 204, and a data storage device 206. The data storage device 206 (e.g., electronic memory) stores one or more software program modules or software instructions, including the vehicle navigation module 202, for execution by the data processor 204.

In embodiments, the vehicle navigation module 202 is configured or adapted to receive, from a vehicle, a request for navigation guidance comprising a desired destination and a vehicle identifier (e.g., VIN); in response thereto, calculate a route from a starting location of the vehicle to the destination; generate a series of maneuvers, or static navigational directions, for guiding the vehicle operator along the calculated route; send at least one of the navigational directions to the requesting vehicle; and send the entire series of maneuvers to other roadside units located along the calculated route. In addition, the vehicle navigation module 202 can be configured to receive, from another roadside unit, one or more maneuvers that are associated with a vehicle identifier and store both in the data storage device 206; determine that a vehicle associated with the vehicle identifier is within a wireless communication range or other predetermined distance of the computing device 200 (e.g., is approaching the roadside unit); and provide the received maneuver(s) to the vehicle for presentation therein. Further, the vehicle navigation module 202 can be configured to determine whether a passing vehicle is on-route, or following the navigation guidance provided to the vehicle by the infrastructure 12; and if the vehicle not on-route, generate a new route to the intended destination, or updated maneuvers for guiding the vehicle 10 back onto the previously calculated route.

As shown in FIG. 2, the data storage device 206 also stores vehicle data 208 and maneuver data 210. In embodiments, the data processor 204 can be configured to access (e.g., retrieve, store, or overwrite) the vehicle data 208 and the maneuver data 210 stored in the data storage device 206 in order to carry out various aspects of the navigation unit 202. The vehicle data 208 can comprise the vehicle identifier (e.g., VIN, username, or other unique identifier) received from each vehicle requesting navigation guidance from the computing device 200, and the maneuver data 210 can comprise the series of maneuvers generated by the navigation unit 202 for each requesting vehicle. In some cases, the maneuver data 210 can comprise one or more maneuvers received from other roadside units for guiding passing vehicles, or vehicles that are traveling on a route adjacent to the computing device 200. In such cases, the vehicle data 208 can also comprise the vehicle identifier for each of the passing vehicles. In embodiments, the data storage device 206 can be configured to store the maneuver data 210 for each vehicle in association with the corresponding vehicle data 208 for that vehicle, for example, using a look-up table and/or in one or more databases.

As shown, the computing device 200 further includes a wireless communication module 212 for enabling wireless communications with other roadside units of the infrastructure 12 and passing vehicles within the environment 100. The communication module 212 can include one or more antennas, radios, modems, receivers, and/or transmitters (not shown) for connecting to, or interfacing with, one or more wireless networks, such as, for example, WiFi, cellular, Bluetooth, NFC, RFID, satellite, DSRC, and/or infrared. In a preferred embodiment, the wireless communication module 212 includes a DSRC transceiver 214 for wirelessly communicating with other roadside units and passing vehicles over the DSRC network. In some embodiments, the communication module 212 also includes a mobile communication unit (not shown) for wirelessly communicating over a cellular network (e.g., GSM, GPRS, LTE, 3G, 4G, CDMA, etc.), an 802.11 network (e.g., WiFi), a WiMax network, and/or a satellite network.

In embodiments, the wireless communication module 212 receives external data from passing vehicles, other roadside units, and/or a remote server associated with the infrastructure 12, and provides the external data to the data processor 204 for processing the data according to instructions included in the vehicle navigation module 202 and/or for storing the received data in the data storage device 206. The external data can include a request for navigation guidance received from one or more passing vehicles, the request including a desired destination and a vehicle identifier; one or more maneuvers for guiding a passing vehicle to its desired destination; real-time traffic information, including road conditions or closures, weather information, and/or emergency notifications; and any other information that is exchanged over the DSRC network. In addition, the wireless communication module 212 transmits, to other roadside units, passing vehicles, and/or the remote server, internal data received from and/or generated by the data processor 204, for example, while executing the vehicle navigation module 202. The internal data can include the maneuver data 210 generated using the navigation module 202 and/or retrieved from the data storage device 206, the vehicle data 208 retrieved from the data storage device 206, and any other information stored in, and/or generated by, the computing device 200.

The data storage device 206 can comprise one or more of electronic memory, nonvolatile random access memory (e.g., RAM), flip-flops, a computer-writable or computer-readable storage medium, a magnetic or optical data storage device, a magnetic or optical disc drive, a hard disk drive, or other electronic device for storing, retrieving, reading, or writing data. The data storage device 206 may temporarily store the maneuver data 210 and the vehicle data 208, for example, until the vehicle 10 reaches the indicated destination. In other cases, the data storage device 206 may store the data 208 and 210 for a longer term, for example, to allow future retrieval of the maneuvers for the next time a vehicle wishes to travel to the same destination along the same route.

The data processor 204 can comprise one or more of a microprocessor, a microcontroller, a programmable logic array, an application-specific integrated circuit, a logic device, or other electronic device for processing, inputting, outputting, manipulating, storing, or retrieving data. In some embodiments, the computing device 200 can comprise a general purpose computer that is programmed with various programming instructions or modules stored in the data storage device 206 (such as, e.g., the vehicle navigation module 202) or elsewhere. Though not shown, the computing device 200 may include a data bus, one or more input devices, and one or more output devices for facilitating operation of, or communication between, the data processor 204, the data storage device 206, and/or the wireless communication module 212.

Referring now to FIG. 3, shown is an example vehicle computing system (VCS) 300 that may be included in the vehicle 10, for example, as part of a vehicle electronics system or an infotainment system of the vehicle 10. The VCS 300 may be an infotainment system such as the SYNC® system manufactured by FORD MOTOR COM- PANY®. Other embodiments of the VCS 300 can include different, fewer, or additional components than those described below and shown in FIG. 3.

As illustrated, the VCS 300 comprises a data processor 302 (e.g., an electronic data processor), a data storage device 304, and a vehicle data bus 306. The VCS 300 can further include various electronic control units (ECUs) responsible for monitoring and controlling the electrical systems or subsystems of the vehicle 10. Each ECU may include, for example, one or more inputs and outputs for gathering, receiving, and/or transmitting data, a memory for storing the data, and a processor for processing the data and/or generating new information based thereon. In the illustrated embodiment, the ECUs of the VCS 300 include a telematics control unit 308, a human machine interface (HMI) or user interface 310, and a vehicle audio system 312. Though not shown, the VCS 300 may include other ECUs, such as, for example, a body control module (BCM) for controlling and monitoring various electronic accessories in a body of the vehicle 10 and a powertrain control module for controlling and monitoring an engine and transmission of the vehicle 10.

The ECUs of the VCS 300 are interconnected by the vehicle data bus 306 (such as, e.g., a controller area network (CAN) bus or an automotive Ethernet bus), which passes data to and from the various ECUs, as well as other vehicle and/or auxiliary components in communication with the VCS 300. Further, the data processor 302 can communicate with any one of the ECUs and the data storage device 304 via the data bus 306 in order to carry out one or more functions, including the functions associated with a network navigation module 314.

The data processor 302 can comprise one or more of a microprocessor, a microcontroller, a programmable logic array, an application-specific integrated circuit, a logic device, or other electronic device for processing, inputting, outputting, manipulating, storing, or retrieving data. In embodiments, the VCS 300 can comprise a general purpose computer that is programmed with various programming instructions or modules stored in the data storage device 304 (such as, e.g., the network navigation module 314) or elsewhere.

The telematics control unit (TCU) 309 can be an ECU for enabling the vehicle 10 to connect to one or more wireless networks, such as, for example, WiFi, cellular, Bluetooth, NFC, RFID, satellite, DSRC, and infrared. In embodiments, the TCU 308 includes a wireless communication module 316 comprising one or more antennas, radios, modems, receivers, and/or transmitters (not shown) for connecting to, or interfacing with, the various wireless networks. In a preferred embodiment, the wireless communication module 316 includes a DSRC transceiver 318 for wirelessly communicating with the infrastructure 12 over the DSRC network. In embodiments, the wireless communication module 316 can also include a mobile communication unit (not shown) for wirelessly communicating over a cellular network (e.g., GSM, GPRS, LTE, 3G, 4G, CDMA, etc.), an 802.11 network (e.g., WiFi), a WiMax network, and/or a satellite network. In accordance with embodiments, it should be noted that the TCU 308 of the vehicle 10 does not include a location-determining receiver (e.g., GPS) or other navigation capability.

In embodiments, the TCU 308 receives external data, including navigation guidance, from the infrastructure 12 via the wireless communication module 316 and/or the DSRC transceiver 318, and provides the external data to the data processor 302, the data storage device 304, the user interface 310, the audio system 312, or any other appropriate component of the VCS 300. In one embodiment, when the TCU 308 receives navigation guidance from the infrastructure 12, the TCU 308 sends the navigation guidance to the data processor 302, via the vehicle data bus 306, for processing in accordance with the network navigation module 314. In addition, the TCU 308 transmits internal data, including a request for navigation guidance, to the infrastructure 12 via the wireless communication module 316 and/or the DSRC transceiver 318. The TCU 308 may receive the internal data from the data processor 302, the data storage device 304, the user interface 310, or other component of the computing device 300. For example, the request for navigation guidance can comprise a desired destination received via the user interface 310 and a vehicle identifier retrieved from the data storage device 304.

According to embodiments, the user interface 310 (also known as a human-machine interface (HMI)) can be an ECU for enabling user interaction with the vehicle 10 and for presenting vehicle information to the vehicle operator or driver. The user interface 310 can be configured to interact with other ECUs of the vehicle 10, including the audio system 312 and the TCU 308, the data storage device 304, and/or the data processor 302, via the data bus 306, in order to provide information or inputs received via the user interface 310 to an appropriate component of the VCS 300 and to present, to the vehicle operator, information or outputs received from the various components of the VCS 300.

As shown, the user interface 310 can comprise an in-vehicle voice or speech recognition module 320, one or more displays or display screens 322, one or more audio speakers 324, and a plurality of input devices 326, as well as various other devices for inputting, entering, receiving, capturing, displaying, or outputting data associated with the vehicle computing system 300, the network navigation module 314, and/or the techniques disclosed herein. According to embodiments, the input devices 326 can include, for example, one or more of a keyboard, keypad, pointing device (e.g., electronic or optical mouse), button or push button, slider, switch, knob, dial, touch input device, microphone, and any other type of input device.

In some embodiments, the user interface 310 includes an instrument panel (IP) (not shown) positioned in a dashboard of the vehicle 10 for housing instrumentation and controls for operation of the vehicle 10, such as, e.g., a steering wheel and various gauges (e.g., speedometer, odometer, fuel gauge, etc.), as well as vehicle indicators, such as, e.g., gear selector position, seat belt warnings, etc. In some cases, at least one of the displays 322 is a display screen of the instrument panel (also referred to herein as an "IP display") for electronically or digitally displaying the various gauges, or values related thereto, the various vehicle indicators, and other vehicle information. In some embodiments, one or more of the input devices 326 is included in, or configured to control, the instrument panel (also referred to herein as "IP inputs").

In some embodiments, the one or more display(s) 322 includes a media display screen (not shown) that is separate from the instrument panel and is configured to display additional vehicle information, such as, e.g., information related to the audio system 312, video captured by an external vehicle camera (not shown), heating and air-conditioning information, etc. In such cases, one or more of the input devices 326 can be configured to control data displayed via the media display screen (also referred to herein as "media inputs").

In embodiments, though not shown, the vehicle audio system 312 includes an AM/FM radio receiver or tuner, an amplifier for driving an audio signal to one or more audio speakers 324, or other audio output devices, and one or more media devices (e.g., tape player, CD player, DVD player, satellite radio, auxiliary devices, etc.). In some embodiments, the audio system 312 forms part of a pre-installed infotainment system or other original equipment manufacturer (OEM) system of the vehicle 10. In other embodiments, the audio system 312 comprises a head unit that is installed in the vehicle 10 after-market, for example, by coupling the head unit to the vehicle audio speakers and other OEM components of the vehicle computing system 300.

One or more components of the user interface 310 can be included in the audio system 312. For example, in one embodiment, at least one of the displays 322 (e.g., an audio display or the media display screen), at least one of the audio speakers 324, and one or more of the input devices 326 (also referred to herein as "audio inputs") can form part of, or be integrated into, the audio system 312 in order to enable user interaction with the audio system 312 and playback of audio signals produced by, or received at, the audio system 312. In such cases, the audio display 322 may display media information (e.g., radio station number and/or name, track name, track number, artist name, time remaining, time elapsed, etc.) and/or current setting information (e.g., volume level, equalization level(s), fade and balance levels, media mode (e.g., AM/FM radio, CD, Line-In, etc.), etc.) of the audio system 312. Likewise, the audio input devices 326 may include dials (e.g., radio tuner dials, volume dial, etc.), switches, knobs, buttons, and/or touch inputs, for controlling various features and options of the audio system 312, such as, for example, power, play, next, fast-forward, rewind, back, search, stop, skip, etc.

In accordance with embodiments, the user interface 310 can be configured to present the navigation guidance received from the infrastructure 12 to a vehicle operator as at least one of audio (or audible) messages, textual (or written) messages, and symbolic (or graphic) messages. In some cases, the network navigation module 314 may present the navigation guidance using a combination of audio, text, and/or graphic messages.

For example, the network navigation module 314 can be configured to convert the navigation guidance into audio messages or files and provide the audio files to the audio system 312 for playback through the one or more audio speakers 324. In such cases, the vehicle operator may control playback of the audio files using the audio input devices 326 of the user interface 310, such as, for example, a play input, a stop input, a rewind input, or a forward input.

As another example, the network navigation module 314 can be configured to convert the navigation guidance into text messages or files and provide the text files to one of the displays 322 for displaying the navigation guidance thereon. In such cases, the vehicle operator may control display of the text files using the input devices 326 that are associated with the given display 322 (e.g., audio inputs if displayed on the audio display, media inputs if displayed on the media display screen, or IP inputs if displayed on the IP display).

As an additional example, in some cases, the network navigation module 314 can be configured to convert the navigation guidance into graphic messages or files comprising symbols, icons, or images that represent one or more aspects of each maneuver, and provide the graphic files to one of the displays 322 for displaying the navigation guidance thereon. For example, the graphic messages may include a directional symbols (e.g., a right arrow, a left arrow, a U-turn arrow, etc.) to indicate a direction of travel associated with a maneuver. In some cases, the graphic messages may include an image or photograph of a point of interest, street sign, or intersection associated with a maneuver. Also, the graphic messages may include an icon, logo, or symbol that represents an aspect of a maneuver (e.g., symbols for highway, route, or road markers, logo for a business located at an intersection, etc.).

Regardless of whether the directions are presented as audio, text, and/or graphic messages, the user interface 310 can be configured to individually present (e.g., play or display) each maneuver or direction included in the navigation guidance on a singular or one-by-one basis (e.g., present a first direction, then a second direction in place of the first direction, etc.), if the navigation guidance includes a series of maneuvers. In such cases, one or more components of the user interface 310 can be configured to enable user control of the presentation of the navigation guidance. For example, the user interface 310 may present a next direction in the series of maneuvers upon receiving a user input to move forward (e.g., selection of a next or fast forward button or touch input, or a voice command of "next"). Also, the user interface 310 may present a previous direction, or move backwards, in the series of maneuvers upon receiving a user input to go back (e.g., selection of a back or rewind button or touch input, or a voice command of "go back"). In some cases, the user interface 310 may repeat presentation of a currently-selected maneuver upon receiving a user input to re-play or play again (e.g., selection of a play button or touch input, or a voice command of "repeat").

The data storage device 304 can comprise one or more of electronic memory, nonvolatile random access memory (e.g., RAM), flip-flops, a computer-writable or computer-readable storage medium, a magnetic or optical data storage device, a magnetic or optical disc drive, a hard disk drive, or other electronic device for storing, retrieving, reading, or writing data. In some cases, the data storage device 304 stores navigation guidance data 328 comprising navigation guidance received from the infrastructure 12 in response to a request for navigation guidance, as well as the audio, text, and/or graphic messages generated by the network navigation module 314 for presentation of the navigation guidance to the vehicle operator. The data storage device 304 may temporarily store the navigation guidance data 328, for example, until the vehicle 10 reaches the indicated destination. In other cases, the data storage device 304 may store the navigation guidance data 328 for a longer term, for example, to allow future retrieval of the data 328 for the next time the vehicle operator wishes to travel to the same destination. As shown in FIG. 3, the data storage device 304 also stores vehicle identification data 330 comprising a vehicle identifier (e.g., VIN, username, or other unique identifier) associated with the vehicle 10. In embodiments, the data processor 302 retrieves the vehicle identifier from the data storage device 304 upon receiving a desired destination via the vehicle operator to generate the request for navigation guidance.

In addition, the data storage device 304 stores one or more software program modules or software instructions, including the network navigation module 314, for execution by the data processor 302. According to embodiments, the network navigation module 314 is configured or adapted to receive user-entered destination information via the user interface 310 generate a request for navigation guidance using the received destination using destination and a vehicle identifier retrieved from the data storage device 304 (e.g., from the vehicle identification data 330); send the navigation guidance request to the TCU 308 for transmission to the infrastructure 12 via the DSRC transceiver 318; receive navigation guidance to the indicated destination from the infrastructure 12 via the DSRC transceiver 318; store the received navigation guidance in the data storage device 304 (e.g., as navigation guidance data 328); and provide the navigation guidance to the user interface 310 for presentation to the vehicle operator as audio, text, and/or graphic messages. In some embodiments, the network navigation module 314 is also configured to select one of the roadside units 12 based on proximity to the starting location of the vehicle and send the request for navigation guidance to the selected unit 12.

Figure 4:
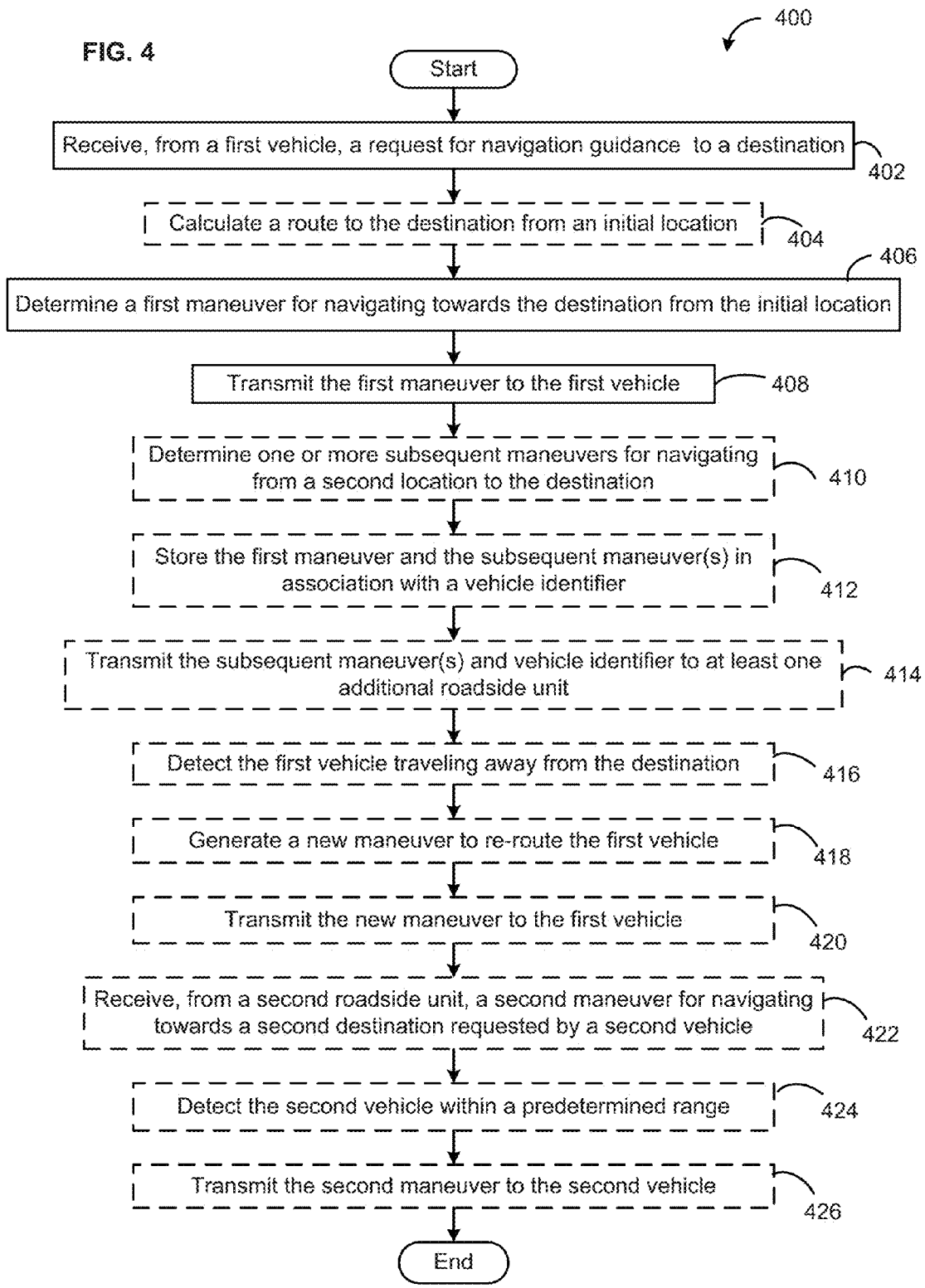
FIG. 4 is a flow diagram of an example method for providing navigation guidance using a wireless communication network, in accordance with certain embodiments.

FIG. 4 illustrates an example method 400 for providing navigation guidance to a vehicle using roadside infrastructure communicatively coupled to a wireless network, in accordance with embodiments. The method 400 can be carried out by one or more roadside units included in the infrastructure, such as the roadside units 12 shown in FIG. 1, or more specifically, a computing device included in the unit, such as the computing device 200 shown in FIG. 2. Further, the roadside units 12 can interact with one or more components of the environment 100, such as the vehicle 10 and other roadside units 12, in order to carry out the operation of the method 400. In one embodiment, the method 400 is implemented, at least in part by the data processor 204 executing software stored in the data storage device 206 of at least one of the roadside units 12, such as, the vehicle navigation module 202.

The method 400 can begin at step 402, where a request for navigation guidance to a destination is received from a non-navigation-capable vehicle (e.g., the vehicle 10) via a wireless transceiver (e.g., the DSRC transceiver 214 shown in FIG. 2) of a roadside unit (e.g., unit 12a in FIG. 1). The request can include destination information selected or entered by a vehicle operator or driver, for example, using a user interface of the vehicle, the destination information including an address, a point of interest, an intersection, coordinates, and/or other location marker. In addition to destination information, the request can include a vehicle identifier, such as, a VIN, a username, or other information for uniquely identifying the vehicle. The request for navigation guidance can be transmitted or broadcast by a wireless transceiver (e.g., the DSRC transceiver 318 shown in FIG. 3) of the vehicle, and can be received by the roadside unit when, for example, the vehicle is within a reception range (e.g., 100-1000 meters) of the wireless transceiver of the roadside unit. In embodiments, the roadside unit that receives the request can be the unit that is closest to the vehicle when the request is sent out.

In embodiments, the method 400 continues to step 404, where upon receiving the request, the roadside unit processor calculates a route from a starting or initial location to the destination included in the request (such as, e.g., route 22 from point A to point B, as shown in FIG. 1). The starting location may be determined by the roadside unit (e.g., using triangulation techniques) and may include, for example, a current location of the vehicle or a location of the vehicle at the time of submitting the request. The roadside unit processor may use map data stored in a memory of its computing device, as well as real-time information received from the roadside infrastructure or a remote server associated therewith, to calculate the route.

The calculated route can include a series of maneuvers or directions for navigating the vehicle to the destination from the initial location. Each maneuver can include one or more of directional commands (e.g., turn, merge, stay, etc.), street names or other roadside descriptors to indicate where or when to perform the directional commands, and driving distances or times associated with performing the commands. In embodiments, the roadside unit processor can generate the series of maneuvers according to wireless protocol requirements for the wireless network being used to communicate with the vehicle (e.g., DSRC message protocols).

At step 406, the roadside unit can determine a first maneuver for navigating the vehicle towards the destination from the initial location, and at step 408, the roadside unit processor can transmit the first maneuver to the vehicle, for example, using the wireless transceiver of the roadside unit. The first maneuver can be an initial one of the series of maneuvers included in the calculated route. For example, the first maneuver can be configured to navigate the vehicle from the initial location (e.g., point A in FIG. 1) to a second or next location (e.g., intersection 16b in FIG. 1) along the calculated route.

In some embodiments, the method 400 further includes step 410, where the roadside unit processor generates one or more subsequent maneuvers, or the maneuvers that sequentially follow the first maneuver for the route to the requested destination. For example, the subsequent maneuvers can be configured to navigate the vehicle from the second location to one or more intermediate locations (e.g., intersection 16c in FIG. 1) and/or to the destination (e.g., point B in FIG. 1). In some embodiments, the method 400 further includes step 412, where the processor stores the calculated route, including the first maneuver and the subsequent maneuvers, in association with the vehicle identifier received from the vehicle, in the roadside unit memory. At step 414, the roadside unit transmits the subsequent maneuvers and the vehicle identifier to at least one additional roadside unit along the route (e.g., subsequent units 12b, 12c, and/or 12d in FIG. 1). In some cases, the roadside unit sends the entire route, including the first maneuver and the subsequent maneuvers, to each of the additional roadside units. The other roadside units store the received maneuvers in association with the vehicle identifier to facilitate future retrieval of the maneuvers for guiding the vehicle along the route.

In other embodiments, the roadside unit only generates and sends the first maneuver to the vehicle, and the vehicle obtains the subsequent maneuvers from other roadside units along the route to the destination. For example, as the vehicle completes the first maneuver, the vehicle can send a second request for route guidance that is received by a subsequent roadside unit along the route. The subsequent roadside unit then generates a next maneuver for navigating the vehicle towards the destination and provides this maneuver to the vehicle. This process may continue with the remaining roadside units along the route until the vehicle has reached the destination.

In some embodiments, the method 400 can include steps for monitoring a progress of any passing vehicle that is in a navigation guidance mode, or has requested navigation guidance to a destination and is following a route provided by the roadside infrastructure (e.g., another roadside unit). In some cases, each vehicle can periodically broadcast an on-route status message to request confirmation from nearby roadside units that the vehicle is still following the calculated route to the destination. In response to the status message, or as a navigation guidance vehicle passes a given roadside unit, the roadside unit can retrieve the stored maneuvers and access whether the vehicle is still on route.

In such embodiments, the method 400 can include step 416, where one of the roadside units (e.g., units 12c and/or 12e in FIG. 1) determines or detects that the vehicle is traveling away from its intended destination, or has otherwise moved off the calculated route based on the stored maneuver data for that vehicle. For example, the vehicle may go off-route because it is unable to perform a maneuver due to road closures or other traffic conditions. In other cases, the vehicle may go off-route because the driver failed to perform a maneuver. In embodiments, the roadside unit can determine the current location of the vehicle via trilateration or triangulation methods performed using the wireless transceiver. From step 416, the method 400 can continue to step 418, where the roadside unit processor generates a new maneuver to re-route the off-route vehicle towards its intended destination, and then to step 420, where the roadside unit transmits the new maneuver to the vehicle.

In embodiments, the roadside infrastructure is configured to provide step-by-step navigational directions to the vehicle as it travels towards its intended destination. In particular, by sending the subsequent maneuvers for a route to other roadside units along the route, each of the other roadside units can help keep the vehicle on-route and provide navigation guidance throughout the route. Accordingly, in some embodiments, the method 400 includes step 422, where the roadside unit receives one or more maneuvers from another roadside unit to help another vehicle participating in navigation guidance mode. For example, while a first roadside unit (e.g., unit 12a) is assisting a first vehicle (e.g., vehicle 10), a second vehicle may request a second roadside unit (e.g., unit 12b) to provide navigation guidance to a second destination (e.g., point C). The second roadside unit can fulfill the request according to one or more of steps 402-414. For example, the second roadside unit can calculate a route to the destination C, provide a first maneuver of the route to the second vehicle, and send a subsequent or second maneuver to the first roadside unit, along with a second vehicle identifier of the second vehicle.

Upon receiving the second maneuver at step 422, the first roadside unit can store the second maneuver in association with the second vehicle identifier in the memory of the first roadside unit, and can monitor a progress of the second vehicle. For example, the first roadside unit can search for the second vehicle (e.g., based on the vehicle identifier of the second vehicle) to determine whether the vehicle is within a predetermined range (e.g., 100 meters) of the first roadside unit, or is otherwise approaching the first roadside unit. At step 424, the first roadside unit detects the second vehicle within the predetermined range and retrieves the corresponding second maneuver from its memory. At step 426, the first roadside unit transmits the second maneuver to the second vehicle. In some cases, the first roadside unit can continue to monitor the progress of the second vehicle until the vehicle has moved out of the communication range of the first roadside unit. If the second vehicle strays from the route, the first roadside unit may send a newly generated maneuver for re-directing the second vehicle towards its intended destination, for example, in accordance with steps 416-420.

The method 400 may end once the roadside unit determines that the vehicle has reached its intended destination.

Figure 5:
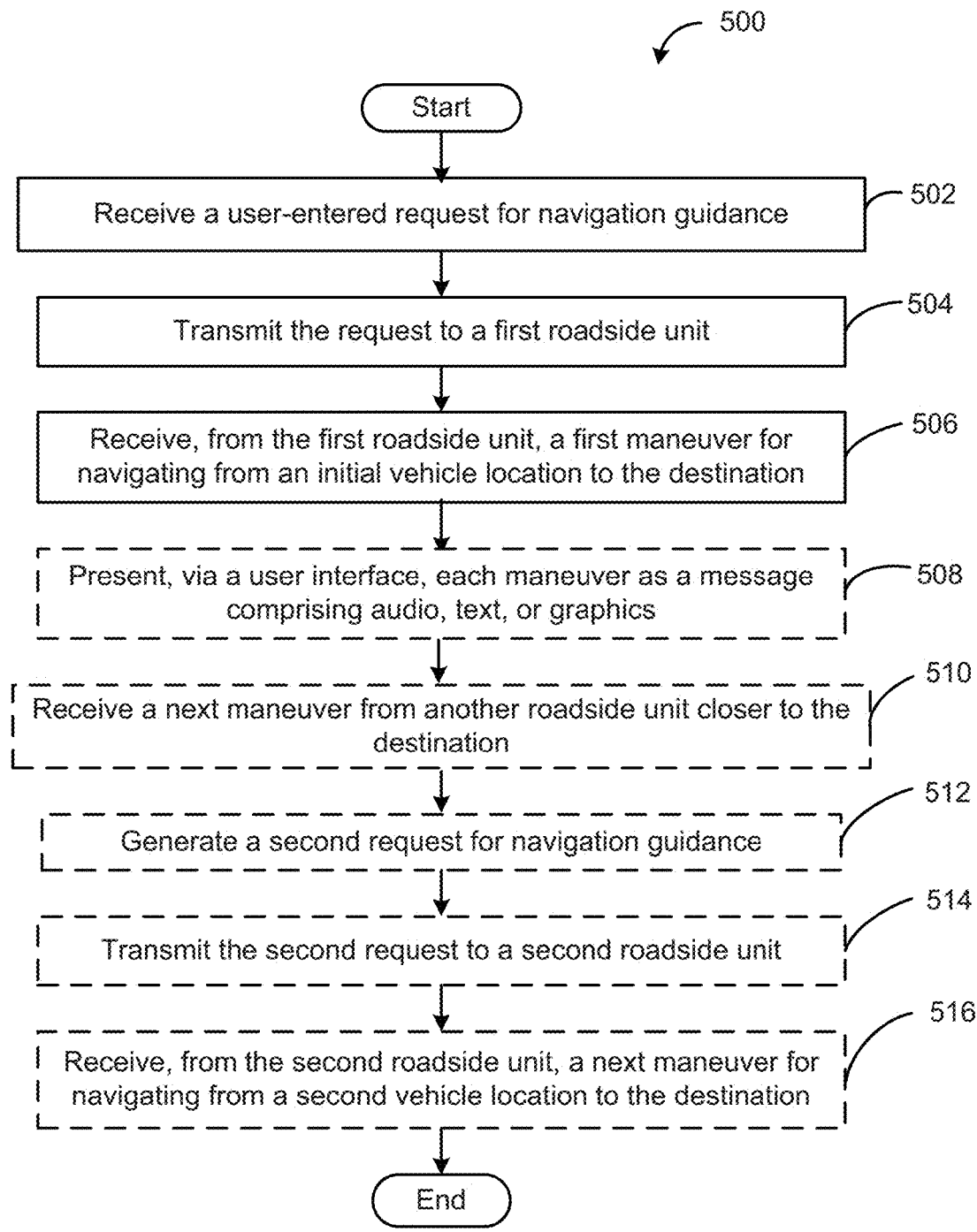
FIG. 5 is a flow diagram of an example method for obtaining navigation guidance in a vehicle using a wireless communication network, in accordance with certain embodiments.

FIG. 5 illustrates an example method 500 for obtaining navigation guidance in a vehicle using a wireless network formed by a plurality of roadside units, in accordance with embodiments. The method 500 can be carried out by a non-navigation-capable vehicle, such as the vehicle 10 shown in FIG. 1, or more specifically, a vehicle computing system therein, such as the VCS 300 shown in FIG. 3. Further, the non-navigation-capable vehicle can interact with one or more components of the environment 100 shown in FIG. 1, such as the roadside units of the infrastructure 12, to carry out the operations of the method 500. In one embodiment, the method 500 is implemented, at least in part, by the data processor 302 executing software stored in the data storage device 304, such as the network navigation module 314, as shown in FIG. 3.

The method 500 can begin at step 502, where vehicle processor receives a request for navigation guidance from a user interface (e.g., user interface 310 shown in FIG. 3). The request can include destination information entered by the vehicle operator using one or more vehicle input devices (e.g., the input devices 326 shown in FIG. 3) of the user interface. The destination information can include, for example, a street address, an intersection or listing of cross streets, a point of interest, or a business or building name. In some cases, the processor and/or the network navigation module can generate the request for navigation guidance based on the user-entered destination information and in accordance with any wireless message protocols associated with a wireless transceiver (e.g., DSRC transceiver 318 shown in FIG. 3) of the vehicle, such as, for example, DSRC message protocols. In some embodiments, the request for navigation guidance generated by the processor further includes a vehicle identifier associated with the vehicle and stored in a vehicle memory (e.g., vehicle identification data 330 shown in FIG. 3).

At step 504, the request for navigation guidance is transmitted by the wireless transceiver of the vehicle to one or more roadside units within a broadcast range (e.g., 100 to 1000 meters) of the vehicle's wireless transceiver, or other predetermined distance from an initial vehicle location. For example, the request for route guidance may be received by a wireless transceiver (e.g., the DSRC transceiver 214 shown in FIG. 2) of a first roadside unit (e.g., unit 12a shown in FIG. 1) that is closest in proximity to the initial vehicle location. In some embodiments, the request may be transmitted directly to one or more specific roadside units using point-to-point communications. In other embodiments, the request may be broadcast to all roadside units within the broadcast range of the vehicle's wireless transceiver.

At step 506, the vehicle processor receives a first maneuver for navigating to the destination from the first roadside unit, or the roadside unit that responded to the request for navigation guidance. The first maneuver may be part of a series of maneuvers, or step-by-step static commands, for guiding the vehicle to its intended destination from the initial vehicle location. Each maneuver can include one or more of directional commands to be performed (e.g., turn, merge, stay, etc.), street names or other roadside descriptors to indicate where or when to perform the directional commands, and driving distances or times associated with performing the commands. The initial vehicle location may be determined by the roadside unit and may include, for example, a location of the vehicle at the time of sending the request or a location of the vehicle when the roadside unit fulfills the request. In embodiments, the first maneuver can be transmitted by the wireless transceiver of the roadside unit, received at the wireless transceiver of the vehicle, and then provided to the network navigation module 314 and/or the data processor 302 for processing.

At step 508, the vehicle processor provides the first maneuver to the user interface of the vehicle to present the maneuver to the vehicle operator. The first maneuver may be presented as at least one of an audio (or audible) message, a textual (or written) message, or a graphical message (e.g., comprising symbols, icons, images, etc.) via the user interface of the vehicle. For example, where the maneuver is presented as a textual and/or graphical message, the network navigation module can generate a string of text, symbols, icons, and/or images representing the navigational direction and provide the same to a display screen (e.g., the display 322 shown in FIG. 3) of the vehicle for display thereon. As another example, where the maneuver is presented as an audio message, the network navigation module can generate an audio file representative of the navigational direction and provide the file to one or more audio speakers (e.g., the audio speakers 324 shown in FIG. 3) of the vehicle for playback there-through.

In some embodiments, the vehicle receives more than one maneuver at a time. In such cases, each maneuver can be individually presented one at a time, and the user can toggle through the series of directions using one or more input devices (e.g., the input devices 326) included in the user interface. For example, the user interface can be used to move forward or backwards through the maneuvers, repeat presentation of a given maneuver, or otherwise control presentation of the maneuvers.

It will be appreciated that the series of maneuvers may include any number of navigational directions, as required to convey route guidance to the indicated destination. Further, each of the maneuvers can be simultaneously in more than one form (e.g., presented audio, text, and/or graphical messages), for example, to make sure the vehicle operator has ample opportunity to receive and understand the directions. If the maneuvers are presented on a display, the display may be configured to scroll the textual or graphical message across the display, for example, if the textual message is longer than a width of the display. In some cases, the user inputs for toggling between the maneuvers can be received as voice commands through a voice or speech recognition system of the vehicle (e.g., the voice recognition module 320 shown in FIG. 3), where the voice commands include "next," "back," "repeat," or the like.

Referring back to FIG. 5, in some embodiments, the method 500 includes step 510, wherein the vehicle processor receives a next maneuver from another roadside unit (e.g., unit 12b shown in FIG. 1) that is closer to the destination than the roadside unit providing the first maneuver. The vehicle may continue to receive subsequent maneuvers from passing roadside units as the vehicle travels towards the destination, for example, where the roadside infrastructure is configured to monitor the progress of the vehicle and provide next maneuvers as the vehicle travels a calculated route to the destination (e.g., according to method 500 shown in FIG. 5). In some embodiments, from step 510, the method 500 may continue back (not shown) to step 508 to present each received maneuver to the vehicle operator.

In some embodiments, the vehicle processor is configured to periodically transmit or broadcast an on-route status message requesting confirmation from the roadside infrastructure that the vehicle is on route (e.g., following the calculate route 22 shown in FIG. 1). The status message may be received by each roadside unit that the vehicle passes. In response to receiving the status request, each roadside unit can assess the vehicle's progress and send, to the vehicle, a confirmation that the vehicle is on-route, a repeat of the current maneuver (e.g., if still valid), or one or more additional maneuvers for re-directing the vehicle towards its intended destination (e.g., if the vehicle is off-route). In other embodiments, the vehicle operator may choose to send a second request for navigation guidance to the destination entered by the user in step 502, for example, if the operator missed a turn or encountered an unexpected road block. The second request for route guidance and the on-route status message may be processed in a similar manner by the roadside unit. For example, like the request for navigation guidance, the on-route status message may include the vehicle's intended destination and the vehicle identifier associated with the vehicle.

In either case, the method 500 can include step 512, wherein the vehicle processor generates the on-route status message or second request for navigation guidance. At step 514, the vehicle processor transmits the second request or the status message to a second roadside unit (e.g., unit 12b) positioned within the predetermined distance (or broadcast range) of a second vehicle location, or a current location of the vehicle at the time of performing steps 512 and/or 514. In some cases, the second roadside unit is further ahead along the route to the destination than, for example, the first roadside unit. In other cases, the second roadside unit may be completely off the route to the destination, for example, if the vehicle has lost its way. At step 516, the vehicle processor receives, from the second roadside unit, a new or second maneuver for navigating from the second vehicle location to the intended destination. In some embodiments, from step 516, the method 500 may continue back (not shown) to step 508 to present the new maneuver to the vehicle operator using the user interface.

The method 500 may end once the vehicle reaches its intended destination.

In certain embodiments, the process descriptions or blocks in the figures, such as FIGS. 4 and 5, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A method for providing navigation guidance to a vehicle using wireless communication with roadside units, the method comprising:
   receiving, from the vehicle, at a wireless transceiver of a first roadside unit, a request for navigation guidance to a destination;
   determining, using a processor of the first roadside unit, a route for navigating to the destination from an initial vehicle location;
   transmitting a first portion of the route to the vehicle, using the wireless transceiver;
   transmitting a remaining portion of the route to at least one additional roadside unit, using the wireless transceiver.

2. The method of claim 1, wherein the first portion of the route includes at least one maneuver configured to navigate the vehicle from the initial location to a second location along the route.

3. The method of claim 2, wherein the remaining portion of the route includes
one or more subsequent maneuvers configured to navigate the vehicle from the second location to the destination.

4. The method of claim 3, further comprising storing, in a memory of the first roadside unit, each of the maneuvers in association with a vehicle identifier included in the request for navigation guidance.

5. The method of claim 4, further comprising transmitting, using the wireless transceiver of the first roadside unit, the vehicle identifier with the one or more subsequent maneuvers to the at least one additional roadside unit.

6. The method of claim 1, further comprising:
receiving, from a second roadside unit, via the wireless transceiver of the first roadside unit, a second maneuver for navigating towards a second destination requested by a second vehicle; and
upon detecting, using the processor, the second vehicle within a predetermined range of the first roadside unit, transmitting the second maneuver to the second vehicle using the wireless transceiver.

7. The method of claim 1, wherein the wireless transceiver is a dedicated short range communication (DSRC) transceiver.

8. The method of claim 1, wherein the remaining portion of the route is not transmitted to the vehicle by the wireless transceiver.

9. The method of claim 1, wherein the remaining portion of the route is directly transmitted to the at least one additional roadside unit by the wireless transceiver.

10. A system comprising:
a vehicle configured to transmit a request for navigation guidance to a destination; and
a first roadside unit comprising a processor and a wireless transceiver and configured to:
receive the request;
determine a route for navigating to the destination from an initial vehicle location;
transmit a first portion of the route to the vehicle; and
transmit a remaining portion of the route to at least one additional roadside unit.

11. The system of claim 10, wherein the first portion of the route includes at least one maneuver configured to navigate the vehicle from the initial location to a second location along the route.

12. The system of claim 11, wherein the remaining portion of the route includes one or more subsequent maneuvers configured to navigate the vehicle from the second location to the destination.

13. The system of claim 12, the first roadside unit further comprising a memory configured to store each of the maneuvers in association with a vehicle identifier included in the request for navigation guidance.

14. The system of claim 13, wherein the first roadside unit is further configured to transmit the vehicle identifier with the one or more subsequent maneuvers to the at least one additional roadside unit.

15. The system of claim 10, wherein the first roadside unit is further configured to:
receive, from a second roadside unit, a second maneuver for navigating towards a second destination requested by a second vehicle; and
upon detecting the second vehicle within a predetermined range of the first roadside unit, transmit the second maneuver to the second vehicle.

16. The system of claim 10, wherein the wireless transceiver is a dedicated short range communication (DSRC) transceiver.

17. The system of claim 10, wherein the remaining portion of the route is not transmitted to the vehicle by the first roadside unit.

18. The system of claim 10, wherein the remaining portion of the route is directly transmitted to the at least one additional roadside unit by the first roadside unit.

19. A roadside unit comprising:
a wireless transceiver configured to receive, from a vehicle, a request for navigation guidance to a destination; and
a processor configured to determine a route for navigating to the destination from an initial vehicle location, wherein the wireless transceiver is further configured to:
transmit a first portion of the route to the vehicle; and
transmit a remaining portion of the route to at least one additional roadside unit.

* * * * *